United States Patent [19]

Freitag

[11] Patent Number: 4,554,742
[45] Date of Patent: Nov. 26, 1985

[54] DIMENSIONAL CHECKING TOOL
[75] Inventor: Otto W. Freitag, Dearborn, Mich.
[73] Assignee: Ford Motor Company, Dearborn, Mich.
[21] Appl. No.: 533,026
[22] Filed: Sep. 16, 1983
[51] Int. Cl.[4] .................................................. G01B 7/14
[52] U.S. Cl. ................................ 33/143 L; 33/147 K; 33/169 B
[58] Field of Search ............ 33/143 L, 147 K, 143 R, 33/147 N, 143 F, 169 B, 169 R, 172 E, 178 E

[56] References Cited

U.S. PATENT DOCUMENTS

| 3,184,857 | 5/1965 | Buechl | 33/169 B |
| 3,867,037 | 2/1975 | Litke | 33/125 C |
| 4,008,523 | 2/1977 | von Voros | 33/147 F |
| 4,345,380 | 8/1982 | Vis | 33/147 N |

FOREIGN PATENT DOCUMENTS 56-54303  5/1981  Japan ................ 33/143 L

Primary Examiner—Willis Little
Attorney, Agent, or Firm—Clifford L. Sadler; Daniel M. Stock

[57] ABSTRACT

A manually operated dimensional checking tool includes a caliper portion having a linearly movable rod member operatively connected to an electrical signal generating mechanism for measuring automobile body gaps, margins, and flushness.

4 Claims, 4 Drawing Figures

U.S. Patent   Nov. 26, 1985   4,554,742
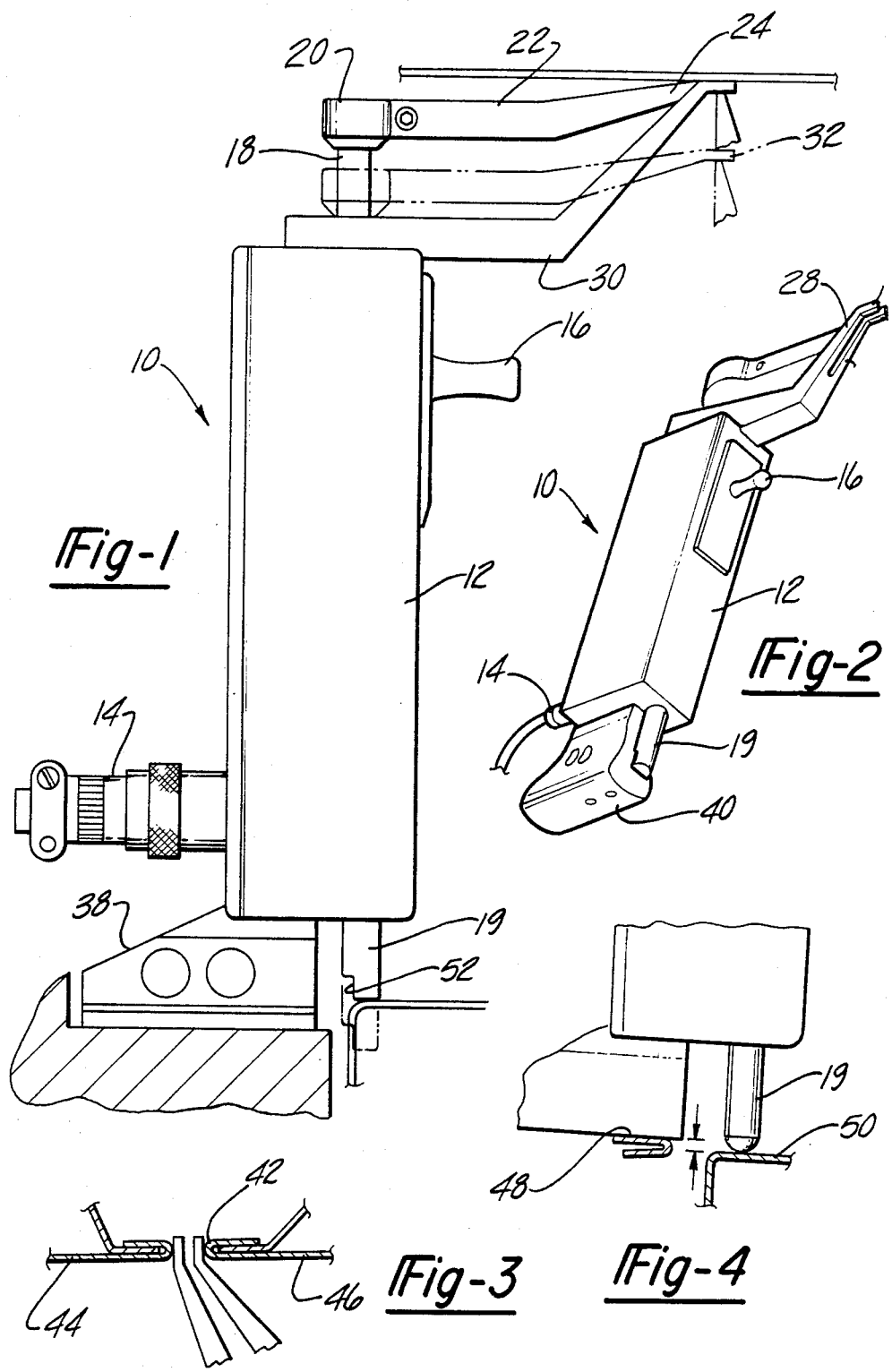

DIMENSIONAL CHECKING TOOL

BACKGROUND OF THE INVENTION

The continuing attention of the automotive industry to the dimensional control of body sheet metal parts has resulted in a great deal of emphasis being given to the control of gaps, margins and flushness between adjacent body panels. Manual checking of such dimensional control criteria has been a laborious and time-consuming process. In the present invention, these manual checks are integrated with a computerized data collection and computation system which is not itself a part of the present invention. Lacking in the prior art has been a single hand-held tool which readily provides the data in a form that may be readily input to such a computerized system.

SUMMARY OF THE INVENTION

It is accordingly an object of the present invention to provide a hand-held mechanism for measuring gaps, margins and flushness of automotive body panels in a manner providing direct electrical signal input to computerized data collecting systems. A handle mechanism is provided which includes an axially moving caliper portion which provides a dimensional signal for transmission.

BRIEF DESCRIPTION OF THE DRAWINGS

FIG. 1 is a side view of the checking tool of the present invention;

FIG. 2 is a perspective view of the measuring element of FIG. 1;

FIG. 3 shows a portion of the invention checking tool used in one measuring mode; and FIG. 4 shows a portion of the invention measuring tool in another measuring mode.

DESCRIPTION OF A PREFERRED EMBODIMENT

Turning now to the drawings and, in particular, to FIG. 1 thereof, the checking tool 10 of the present invention is illustrated as consisting essentially of a handle mechanism 12 embodying an electrical signal transmitting system (not shown) coupled through a cable 14 to a computerized data system (not shown). The tool 10 further includes a trigger mechanism 16 coupled directly to a slide rod 18 carrying a movable portion of a caliper section 20. The central movable portion 22 includes a finger 24 nestably engageable between a pair of fingers 26, 28 attached to an extended base portion 30 mounted to the body portion 12. Tips 32, 34, 36 are provided on the outboard ends of the fingers perpendicular to the axis of the rod 18 for measuring insertion in body crevices.

It will be noted that the bottom of the handle portion 12, is fixed a shoe base 38 is positioned which includes a generously radiused bottom portion 40 and a lower portion 19 of the rod 18 connected to the trigger mechanism is illustrated as extending parallel to the shoe base.

It has been found particularly useful that the finger portions in the caliper measuring section 20 are positioned to extend outwardly and axially distal the handle portion 12. This provides ready access to most measuring locations in automotive body panels while permitting easy manual gripping of the handle.

OPERATION OF THE PREFERRED EMBODIMENT

General operation of the checking tool 10 of the present invention may be seen by reference to the FIG. 1 illustration. Moving the trigger member 16 downwardly from the position shown in FIG. 1 effects downward movement of the rod 18 to the position where the central finger 20 separates from the two fingers 26, 28 with which it is nested. Simultaneously, the lower rod portion 19 extends downwardly from the bottom 13 of the handle portion 12. Within the handle portion 12 is a known electrical signal transmitting device capable of producing a signal proportional to linear travel, such as a linear potentiometer which translates the movement of the rod portion 16 into an electrical signal fed through the cable to the computer data collection system.

In the FIGS. 3, 4 and 5, the actual measurements effected by the tool 10 are illustrated. In FIG. 3, a gap 42 between two adjacent body panels 44, 46 may be measured by insertion of the tips 32, 34, 36 of the fingers and depression of the trigger 16 to define the gap as indicated by the arrows. Radii formed on the tips 32, 34, 36 provide ready planar definition of one side of the gap to be measured.

In FIG. 4, flushness is shown as being determined by positioning the shoe portion 38, in essentially line contact owing to its radius bottom configuration 40 on one panel 48 while depressing the rod 19 against the other panel 50 to define the difference in height of flushness therebetween. The end of the rod at 19 may be deformed as at 52 through undercutting (as may best be seen in FIG. 1) to permit the rod 16 to engage a particular panel of interest and provide clearance over certain ornamentation pieces and other items not of interest in taking a particular measurement. Clearly, it is also possible to take measurements between the two sets of fingers of the caliper mechanism to check thicknesses as required. While only one embodiment of the present invention has been disclosed, others are possible without departing from the scope of the appended claims.

I claim:

1. A dimension checking tool comprising:
   An elongated handle;
   a base portion positioned at one end of the handle, and including a curved outer surface;
   a measuring rod slidably engaged within the elongated handle for longitudinal movement with respect to the elongated handle and extending from one end of the elongated handle;
   a trigger mechanism directly coupled to the measuring rod and extending transversely outwardly from the elongated handle for permitting manual longitudinal positioning of the measuring rod;
   caliper means comprising first finger means fixed for longitudinal movement with the measuring rod and second finger means nestably engageable with the first means and fixed to the one end of the elongated handle, both of said finger means being formed to extend longitudinally and transversely away from the elongated handle; and
   wherein the measuring rod also extends from the other end of the elongated handle, terminating in a curved end portion adjacent the base portion.

2. A checking tool as defined in claim 1 wherein the curved end portion includes a transversely extending undercut.

3. A checking tool as defined in claim 1 and further comprising means for transmitting an electrical signal responsive to movement of the measuring rod.

4. A checking tool as defined in claim 1, wherein said finger means include tip portions extending perpendicular to the axis of the measuring rod.

* * * * *